Dec. 27, 1949     T. M. GUNN     2,492,744

THERMOSTATIC ELEMENT

Filed June 23, 1947

Townsend M. Gunn,
Inventor.
Haynes and Koenig,
Attorneys.

Patented Dec. 27, 1949

2,492,744

UNITED STATES PATENT OFFICE 2,492,744

THERMOSTATIC ELEMENT

Townsend M. Gunn, Attleboro, Mass., assignor to Metals and Controls Corporation, Attleboro, Mass., a corporation of Massachusetts Application June 23, 1947, Serial No. 756,511

8 Claims. (Cl. 297—16)

1

This invention relates to thermostatic elements, more specifically to thermostatic elements adapted particularly for use per se as temperature-responsive fluid flow dampers or the like.

Among the several objects of the invention may be noted the provision of a simplified form of thermostatic element which, in itself, is adapted to function as a valve or damper for controlling the flow of fluids; the provision of a thermostatic element of the class described adapted to have the form of a substantially imperforate sheet at one temperature and to have a perforate form at other temperatures, to permit fluid to flow more freely therethrough at other temperatures; the provision of a thermostatic element of this class wherein the relatively perforate area of the element is determined by the extent of temperature change; and the provision of a thermostatic element such as described particularly adapted for use as a temperature-responsive damper in hot air systems, for controlling the draft of a stove or furnace, or similar uses. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is an isometric view of a blank from which a thermostatic element of this invention is made;

Similar reference characters indicate corresponding parts throughout the several views of the drawings.

Figure 1:
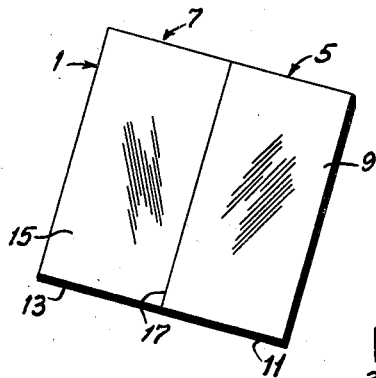
Figure 2:
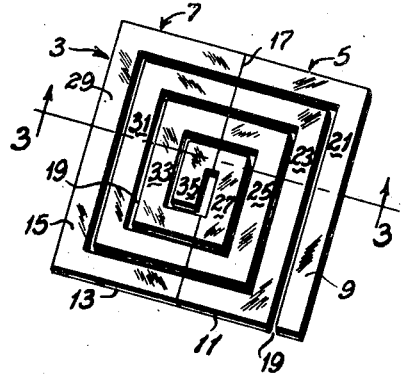
Fig. 2 is an isometric view of a completed thermostatic element of this invention at one temperature.

Referring to the drawings, Fig. 1 illustrates a composite blank 1 of thermostatic metal from which the thermostatic element 3 of Fig. 2 is

2 conveniently formed. The blank comprises two individual rectangular sheets 5 and 7 of thermostatic bimetal. The sheet 5 has component layers 9 and 11 of metals of relatively high and low thermal coefficients of expansion, respectively. Similarly, the sheet 7 has component layers 13 and 15 of metals of relatively high and low thermal coefficients of expansion, respectively. The sheets are joined together along one of their longer edges, as indicated at 17, with high expansion layer 9 of sheet 5 abutting low expansion layer 15 of sheet 7, and with low expansion layer 11 of sheet 5 abutting high expansion layer 13 of sheet 7. This forms the generally rectangular (square) composite blank 1. The sheets may be joined at the junction 17 by welding in the manner disclosed in Chace United States Patent 2,238,034; or in any other suitable manner. Thus, the blank 1 comprises a flat, composite thermostatic sheet having its high and low expansion layers alternatively disposed with respect to opposite faces of the sheet in the respective lateral halves of the sheet.

To form the thermostatic element 3 of Fig. 2, a continuous, narrow, rectangularly spiral slit 19 is cut through the blank 1 leading spirally inward from a point in the outer edge of the blank and adjacent a corner thereof to the center of the blank. This forms the blank into a flat, rectangular spiral having a plurality of convolutions of substantially equal width, the convolutions being spaced apart the relatively narrow width of the slit 19. The latter may be made simply by sawing into the blank, by cutting through it with suitable cutting dies, or in any other suitable way.

This results in a thermostatic element 3 of this invention comprising a plurality of flat, closely spaced, rectangularly spiral convolutions, in each of which the high and low expansion layers are alternatively disposed with respect to opposite faces of the convolutions in the respective halves of the convolutions. The half-convolutions to the right of juncture 17, designated 21, 23, 25 and 27 (in order from the outermost convolution inward), are formed from the sheet 5 of blank 1. Thus, in each of these half-convolutions the high expansion layer 9 is on the top and the low expansion layer 11 is on the bottom with respect to the element 3, as viewed in the drawing. The corresponding half-convolutions to the left of the juncture 17, designated 29, 31, 33, and 35, are formed from sheet 7. Thus, in each of these latter half-convolutions, the high expansion layer 13 is on the bottom and the low expansion layer 15 is on the top of the element 3.

The plane of the bond between the high and low expansion layers of any convolution of the spiral is substantially perpendicular to the central axis of that convolution.

Figure 3:
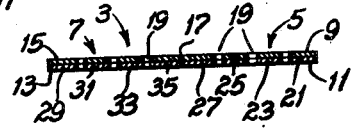
Fig. 3 is a section taken substantially on line 3—3 of Fig. 2.

When the above-described thermostatic element 3 is substantially at the temperature at which the slit 19 has been cut therein, its flat, rectangular spiral convolutions will lie substantially in a flat plane, as illustrated in Figs. 2 and 3. Thus, the thermostatic element at normal temperatures is in the form of a substantially flat sheet pierced only by the relatively narrow slit 19, so that it presents an opening of minimum area therethrough for flow of fluid.

Figure 4:
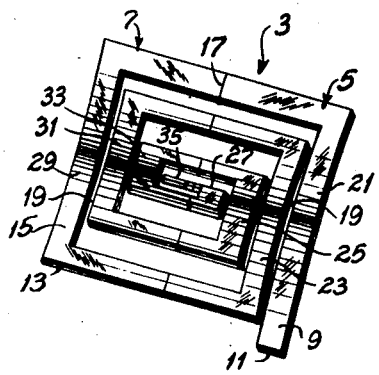
Fig. 4 is an isometric view of the thermostatic element of Fig. 2 at a different temperature.
Figure 5:
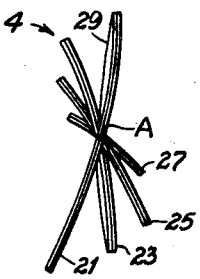
Fig. 5 is a side elevation of Fig. 4.

When the element 3 is heated, the respective half-convolutions 21 and 29, 23 and 31, 25 and 33, 27 and 35 tend to become bowed in opposite directions out of their normal plane, as illustrated in Figs. 4 and 5. The half-convolution 21, for example, becomes convexly bowed while the corresponding half-convolution 29 becomes concavely bowed, as viewed from above Fig. 4 and from the left of Fig. 5. This is because the high and low expansion layers are alternatively disposed in the respective half-convolutions. The same is true of the other related half-convolutions. This opposite bowing of the respective half-convolutions causes these individual convolutions to twist to different angular positions with respect to their normal flat plane about an axis A (Fig. 5) substantially perpendicular to the line of juncture 17 approximately at its mid-point. As best illustrated in Fig. 5, the angular displacement of the convolutions from their normal flat plane is progressively greater from the outermost convolution to the innermost convolution. This is because the angular displacement of each successive half-convolution is additive to that of the preceding half-convolution progressively toward the center of the spiral, due to the bowing of the successive half-convolutions in opposite directions. The result is that the convolutions of thermostatic element 3 become relatively widely spaced from one another so as to provide an opening of relatively large area through the element for passage of fluid.

Thus, there is provided a thermostatic element which has the form of a flat, substantially imperforate sheet at one temperature and which inherently changes its form upon heating to open up a relatively large passage through the sheet for flow of fluid. Such an element is particularly adapted for use as a damper to control flow of fluids in response to temperature. It will be understood that liquid as well as gaseous fluids may be controlled. Other uses for the element 3 will be readily suggested.

Figure 6:
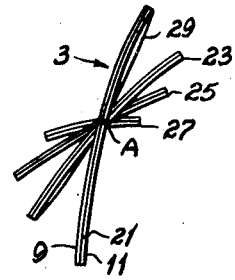
Fig. 6 is a view similar to Fig. 5 illustrating an alternative embodiment of the thermostatic element of this invention.

The above-described thermostatic element 3 has the form of a flat, substantially imperforate sheet when cold (at the temperature at which slit 19 has been cut therein), and assumes its perforate form of Figs. 4 and 5 when heated. If it is desired to have the thermostatic element substantially imperforate or "closed" at an elevated temperature, and perforate or "open" at lower temperatures, the element initially is made in the same form as in Fig. 2. Its convolutions are then mechanically bent, at normal or room temperature, to the configuration illustrated in Fig. 6 to form the thermostatic element generally designated 4 in this figure. The thermostatic element 4 has a configuration generally similar to that of element 3 in its heated form of Fig. 5, but with the convolutions curved and twisted in the opposite sense to that of Fig. 5. Thus, at normal temperature element 4 of Fig. 6 is open. Upon heating, its convolutions will straighten and flex in such manner as to twist about axis A toward their original normal flat plane, and will ultimately all assume their flat plane positions of Fig. 2 at an elevated temperature so as to present a minimum area of opening through the element. The element 4, for example, may be installed in the flue of a stove or furnace to regulate the draft in accordance with the temperature of the gases flowing past the element, thus automatically to regulate combustion.

Figure 7:
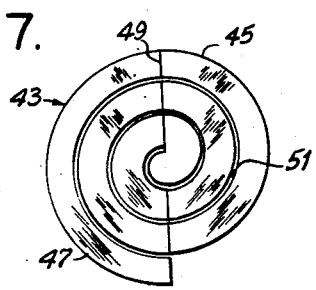
Fig. 7 is a plan view of a further alternative embodiment of the thermostatic element of this invention.

Fig. 7 illustrates an alternative embodiment of the invention wherein the thermostatic element is of arcuate spiral form instead of rectangular spiral form as in Fig. 2. In this case, the thermostatic element 43 is formed from a blank consisting of two individual bimetal sheets 45 and 47 joined at 49 in the same manner as in the embodiment of Figs. 1-5. The slit 51 is cut on an arcuate spiral, rather than on a rectangular spiral. It will be understood that this arcuate spiral form functions upon temperature change in the same manner as the rectangular spiral form of Fig. 2.

In either embodiment as illustrated, the effect of the bowing of the convolutions to change the form of the thermostatic element for a given temperature change progressively decreases from the outermost to the innermost convolution. That is, the outermost convolution has the most effect in changing the form of the element, and the innermost convolution the least. This is because the outermost convolutions have a greater total curvature than the innermost convolutions for a given temperature change, due to the greater length of bimetal therein. If it is desired to increase the effect of the innermost convolutions, all that is necessary is to make the convolutions of progressively greater flexibility in response to temperature change from the outer end of the spiral to its center. This may be accomplished for example by making the convolutions progressively thinner as they progress to the center of the spiral.

The thermostatic element of this invention, either in its embodiment of Figs. 2, 6 or 7, consists in its final form of a continuous length of a composite thermostatic strip which, at a substantially predetermined temperature, assumes the form of a flat spiral wherein the convolutions are closely adjacent one another. In this flat form, the only passage through the element is through the narrow slit 19 of Figs. 2 and 6 or 51 of Fig. 7. Since the area of this slit relative to the total area of the flat spiral is small, the element is said to be substantially imperforate at the stated predetermined temperature.

As illustrated, the thermostatic strip is a bimetallic strip wherein the high and low expansion layers are alternately disposed with respect to opposite faces of its convolutions in progressive sectional lengths (specifically, half-convolutions) of its convolutions from one end of the strip to the other, i. e., the high coefficient layer of each such length or half-convolution is joined endwise to the low coefficient layer of the succeeding and following sectional lengths, and the low coefficient layer of each such length or half-convolution is joined endwise to the high coefficient layer of the succeeding and following sectional lengths. It is contemplated that the thermostatic element may be formed of other composite materials such as, for example, those having more than two layers, and it will be understood that when such material is used the high and low expansion layers will alternate throughout sectional lengths of the convolutions as when bimetallic material is used.

The herein disclosed method of making the thermostatic element of this invention is advantageous because of its simplicity. All that is necessary is to join two sheets of thermostatic material at a juncture line with the high and low expansion layers of the sheets alternately disposed, then to cut the spiral strip through the joined sheets. It will be understood that in the case of polygonal forms the juncture line needs not to be parallel with any edge of the polygon, but may be on a diagonal. The resulting axis A will always be lateral to the juncture line.

While the invention has been described in terms of operation from one open or closed condition to another condition in response to heating from a normal or predetermined temperature, it will be understood that the operation may be arranged to occur in response to cooling from such a temperature.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A thermostatic element comprising a continuous thermostatic strip so convoluted as to assume the form of a flat spiral wherein the convolutions are substantially coplanar and closely adjacent one another at a substantially predetermined temperature, said strip having components of relatively high and low thermal coefficients of expansion which are alternately disposed with respect to opposite faces of its convolutions in progressive sectional lengths of the convolutions from one end of the strip to the other in such manner that each high coefficient component of each such sectional length is joined endwise to the low coefficient components of the succeeding and following sectional lengths, and each low coefficient component of each such sectional length is joined endwise to the high coefficient components of the succeeding and following sectional lengths, whereby said convolutions are adapted to twist out of said flat spiral form upon variation in temperature from said predetermined temperature and to separate from one another so as to provide a passage of substantial area through the thermostatic element.

2. A thermostatic element comprising a continuous, flat, bimetallic thermostatic strip so convoluted as to assume the form of a flat spiral wherein the convolutions are substantially coplanar and closely adjacent one another at a substantially predetermined temperature, the high and low expansion layers of said bimetallic thermostatic strip being alternately disposed with respect to opposite faces of its convolutions in progressive sectional lengths of the convolutions from one end of the strip to the other in such manner that the high coefficient layer of each such sectional length is joined endwise to the low coefficient layers of the succeeding and following sectional lengths, and the low coefficient layer of each sectional length is joined endwise to the high coefficient layers of the succeeding and following sectional lengths, whereby said convolutions are adapted to twist out of said flat spiral form upon variation in temperature from said predetermined temperature and to separate from one another so as to provide a passage of substantial area through the thermostatic element.

3. A thermostatic element comprising a continuous, flat, composite thermostatic strip so convoluted as to assume the form of a flat spiral wherein the convolutions are substantially coplanar and closely adjacent one another at a substantially predetermined temperature, the high and low expansion layers of said strip being alternately disposed with respect to opposite faces of its convolutions in progressive half-convolutions of the strip from one of its ends to the other in such manner that each high coefficient layer of each half-convolution is joined endwise to the low coefficient layers of the succeeding and following half-convolutions, and each low coefficient layer of each half-convolution is joined endwise to the high coefficient layers of the succeeding and following half-convolutions, whereby said convolutions are adapted to twist out of said spiral form upon variation in temperature from said predetermined temperature and to separate from one another so as to provide a passage of substantial area through the thermostatic element.

4. A thermostatic element which, at a substantially predetermined temperature, consists of a plurality of flat, closely spaced, substantially coplanar spiral convolutions of a continuous length of composite thermostatic material, a part of each convolution having its components of relatively high and low thermal coefficients of expansion alternately disposed with respect to the components of relatively high and low thermal coefficients of expansion of the remainder of the convolution in such manner that each high coefficient component of a part of each convolution is joined endwise to a low coefficient component of the remainder of the convolution, and each low coefficient component of said part of each convolution is joined endwise to a high coefficient component of the remainder of the convolution.

5. A thermostatic element which, at a substantially predetermined temperature, consists of a plurality of flat, closely spaced, substantially coplanar spiral convolutions of a continuous length of composite, bimetallic thermostatic material, a part of each convolution having its high and low expansion layers alternately disposed with respect to the high and low expansion layers of the remainder of the convolution in such manner that the high expansion layer of a part of each convolution is joined endwise to the low expansion layer of the remainder of the convolution, and the low expansion layer of said part of each convolution is joined endwise to the high expansion layer of the remainder of the convolution.

6. A thermostatic element which, at a substantially predetermined temperature, consists of a plurality of flat, closely spaced, substantially coplanar spiral convolutions of a continuous length of a flat, composite, bimetallic thermostatic strip, approximately half of each convolution having its high expansion layer on one face thereof and its low expansion layer on the opposite face, the remainder of each convolution having its high expansion layer on said opposite face, and its low expansion layer on said one face.

7. A thermostatic element as set forth in claim 6, wherein said spiral convolutions are of rectangular spiral form.

8. A thermostatic element as set forth in claim 6, wherein said spiral convolutions are of arcuate spiral form.

TOWNSEND M. GUNN.

REFERENCES CITED

The following references are of record in the file of this patent:

UNITED STATES PATENTS

| Number | Name | Date |
| --- | --- | --- |
| 1,564,504 | Woolson | Dec. 8, 1925 |
| 1,867,893 | Roth | July 19, 1932 |
| 2,086,857 | Derby | July 13, 1937 |
| 2,125,858 | Hood | Aug. 2, 1938 |
| 2,162,098 | McCabe | June 13, 1939 |
| 2,262,460 | Johnson | Nov. 11, 1941 |
| 2,278,744 | Sparrow | Apr. 7, 1942 |